Feb. 1, 1966 H. R. KARLEN ETAL 3,232,212
AUTOMATIC COFFEE BREWER
Filed Sept. 13, 1962 7 Sheets-Sheet 4

Feb. 1, 1966     H. R. KARLEN ETAL     3,232,212
AUTOMATIC COFFEE BREWER Filed Sept. 13, 1962     7 Sheets-Sheet 6

United States Patent Office 3,232,212
Patented Feb. 1, 1966

3,232,212
AUTOMATIC COFFEE BREWER
Harvey R. Karlen, Chicago, George C. Sedlack, Skokie, and David C. Eisendrath, Chicago, Ill., assignors to Cory Corporation, a corporation of Delaware
Filed Sept. 13, 1962, Ser. No. 223,464
22 Claims. (Cl. 99—283)

This invention relates to beverage brewing apparatus and in particular to automatic coffee brewing apparatus.

There has long been a need for a compact, efficient automatic coffee brewer suitable for installation as in the kitchen of a home. The present invention comprehends such a brewing apparatus which is adapted for facilitated installation as in a conventional kitchen wall cabinet.

Thus, a principal object of the invention is to provide a new and improved brewing apparatus.

Another object of the invention is to provide such a brewing apparatus arranged for facilitated installation as in a wall cabinet.

A still further object of the invention is the provision of such a brewing apparatus arranged for the automatic brewing of any one of a plurality of different quantities of brew.

Still another object of the invention is the provision of such a brewing apparatus having improved means for controlling the quantity of brew dispensed therefrom.

A still further object of the invention is the provision of such a brewing apparatus having new and improved means for maintaining optimum efficiency of brewing over a wide range of brew deliveries.

Other features and advantages of the invention will be apparent from the following description taken in connection with the accompanying drawing wherein.

In the exemplary embodiment of the invention as disclosed in FIGS. 1–14 of the drawing, a kitchen cabinet structure generally designated 10 is shown to comprise a conventional base cabinet 11 and a conventional wall mounted cabinet 12. A brewing apparatus generally designated 13 embodying the invention is shown installed partially within the wall cabinet 12 and partially extending downwardly therefrom. The brewing apparatus may be installed in association with other suitable cabinet structures, the specific cabinet structure 12 being shown for illustration purposes only.

Figures 1, 7, 8:
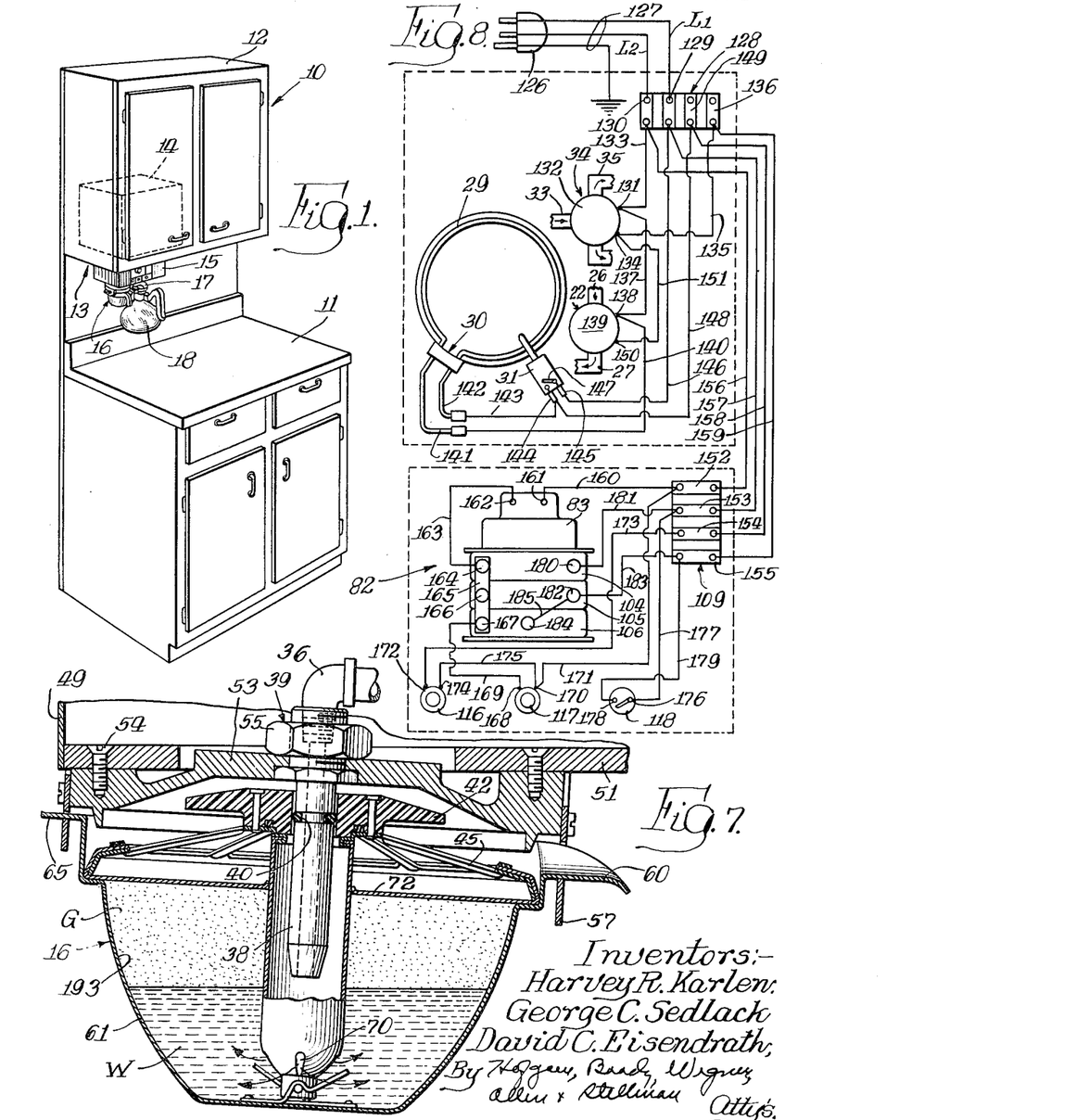
FIG. 1 is an isometric view of a kitchen cabinet means having associated therewith a brewing apparatus embodying the invention.
FIG. 7 is a fragmentary enlarged vertical section generally similar to that of FIG. 6 but with the filler element omitted.
FIG. 8 is a wiring diagram illustrating the electrical circuitry of the brewing apparatus.

As shown in FIG. 1, the portion of brewing apparatus 13 installed within the cabinet 12 is housed in an enclosure 14. The portion of the brewing apparatus extending downwardly from the cabinet includes a control device 15, a brewing means, or cartridge 16, and a support bracket 17 for removably carrying a conventional decanter 18 to receive the brewed beverage from the cartridge 16. While the invention comprehends a brewing apparatus suitable for brewing many different beverages or brews, in illustrating the invention, it will be assumed that the brewing apparatus is arranged for brewing coffee. Thusly, the cartridge 16 herein is arranged for brewing a preselected number of cups of coffee under the control of control means 15 and for delivering the preselected quantity automatically to the decanter 18 for subsequent serving by the user such as a housewife.

Figure 2:
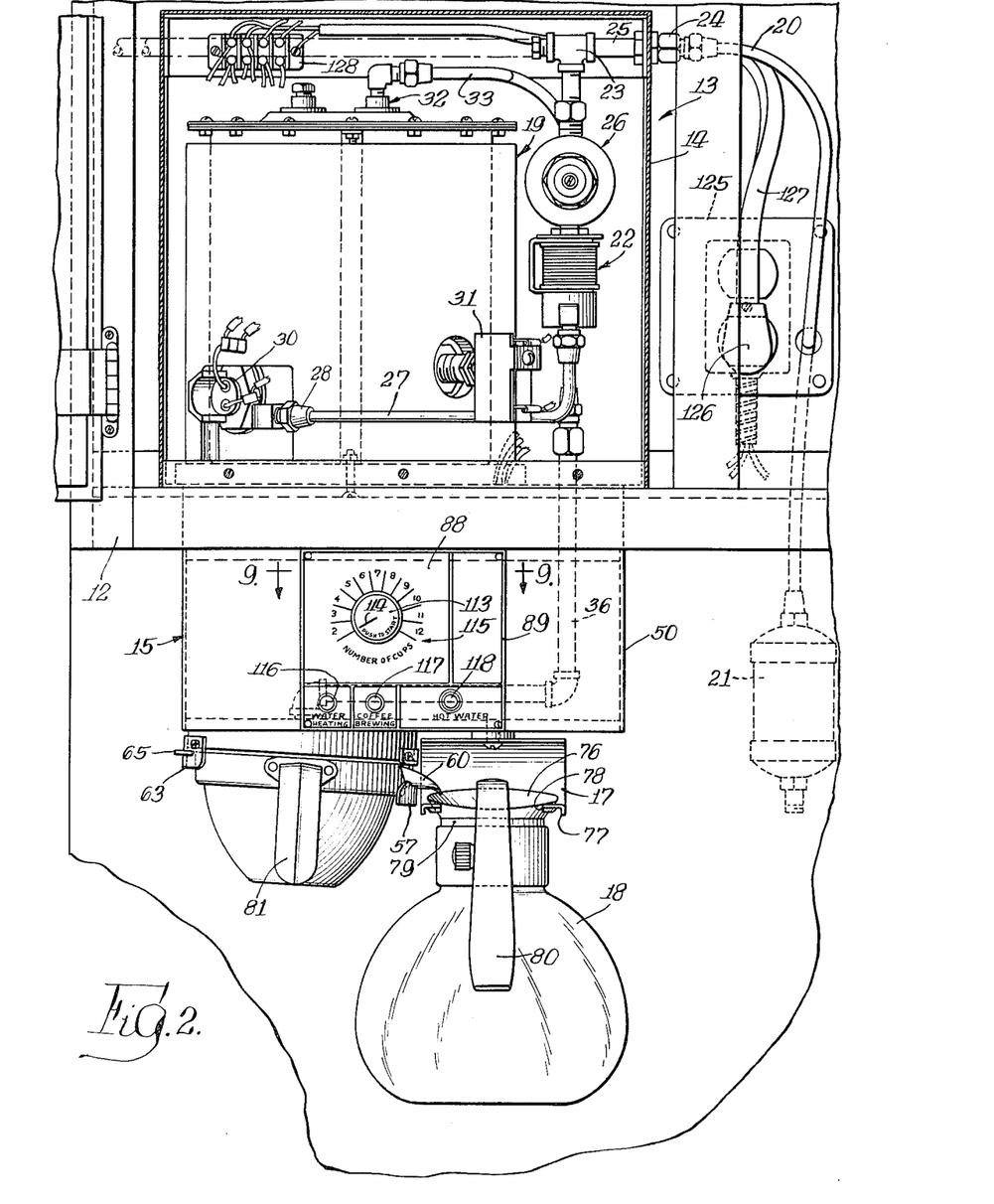
FIG. 2 is a fragmentary enlarged front elevation thereof with the front cover of the hot water tank housing removed.
Figures 3, 4:
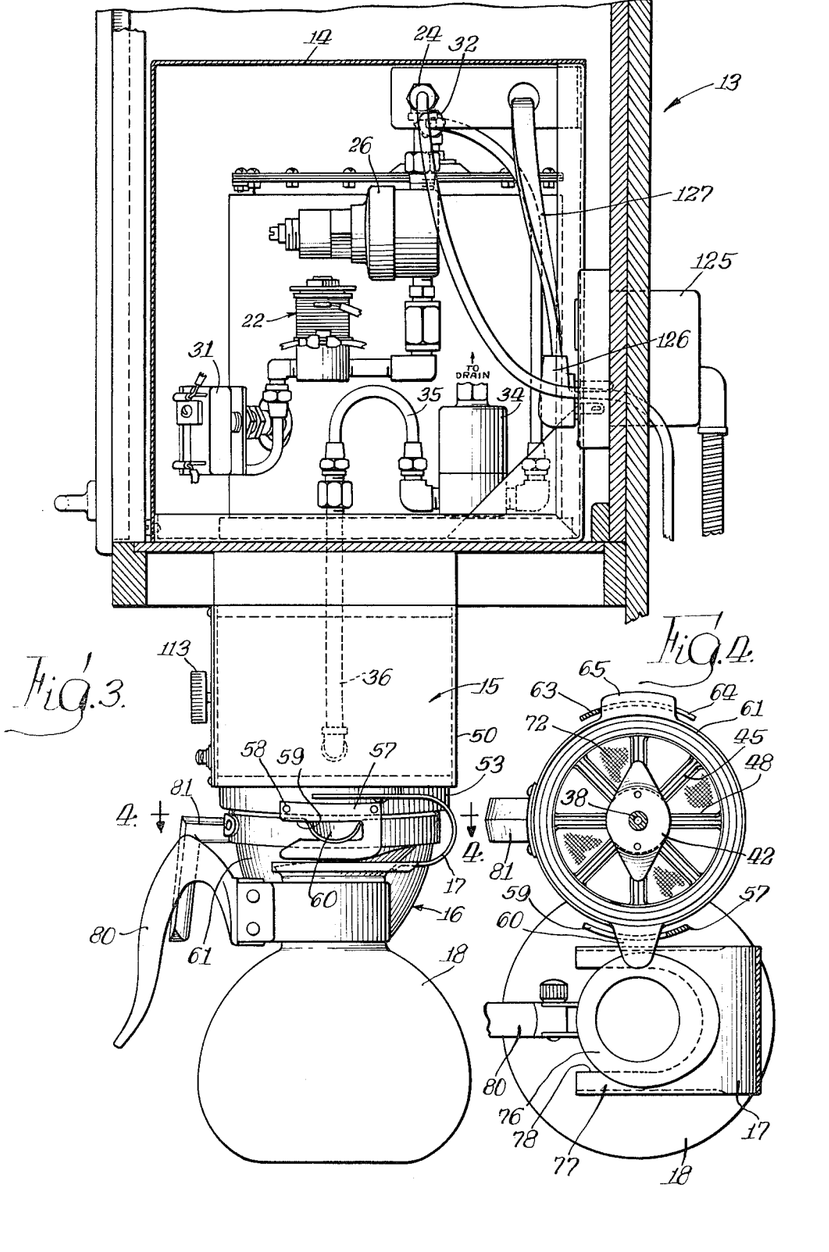
FIG. 3 is a fragmentary left side elevation.
FIG. 4 is a horizontal section taken substantially along the line 4—4 of FIG. 3.
Figure 5:
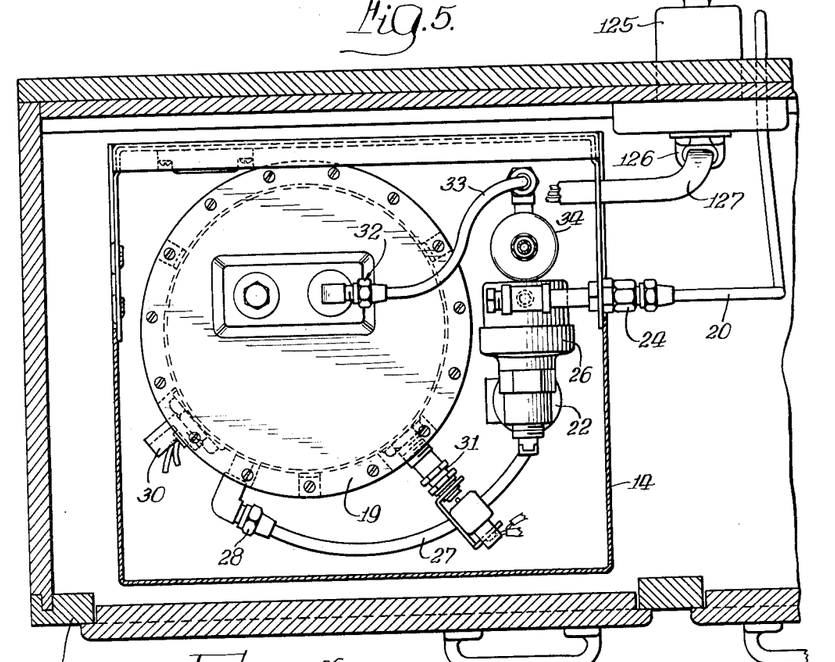
FIG. 5 is a top plan view of the brewing apparatus installed in the wall cabinet.

Referring now more specifically to FIGS. 2 and 3, the brewing apparatus 13 is shown to include a hot water tank 19. Water is delivered to tank 19 from a cold water supply conduit 20 which may be connected through a suitable filter 21 to a source of pressurized water such as the cold water supply line of the home (not shown). A solenoid control valve 22 is connected to the conduit 20 by means of a T 23 which permits the connection to the solenoid valve with conduit 20 entering the housing 14 from either the right-hand side as shown in FIG. 2 or the left-hand side if desired. To facilitate installation, a fitting 24 is provided on the end of a short conduit portion 25 extending to the enclosure wall so that the conduit 20 may be connected to the conduit portion 25 externally of the housing 14. A flow control device 26 may be installed between the valve 22 and the T connection 23 to provide a preselected rate of flow of the incoming water to the tank 19. From the solenoid valve 22, the incoming water is delivered through a conduit 27 to an inlet fitting 28 through which the water enters the tank 19. The water is heated in the tank by suitable means such as an electrical heating coil 29 disposed within the tank 19 and provided with a connector 30 extending through the tank wall for connection of suitable energizing wires thereto as described hereinafter. A thermostat 31 is mounted on the tank 19 to project into the water therein for sensing the temperature of the water and is also electrically connected to the other elements of the circuit as will be described hereinafter.

The hot water tank 19 comprises an open-to-atmosphere type tank wherein the flow of water through the tank is controlled by the inlet valve 22, the outlet from the tank being open at all times. More specifically, the water is delivered from tank 19 through an outlet fitting 32 and a conduit 33 to a three-way solenoid operated valve 34. From one outlet of the valve 34, the water flows through a tube 35 and thence downwardly through a conduit 36 extending through the control 15 to a delivery tube 37 around which cartridge 16 is removably installed. The other outlet of valve 34 may be suitably connected to a drain (not shown).

Figure 6:
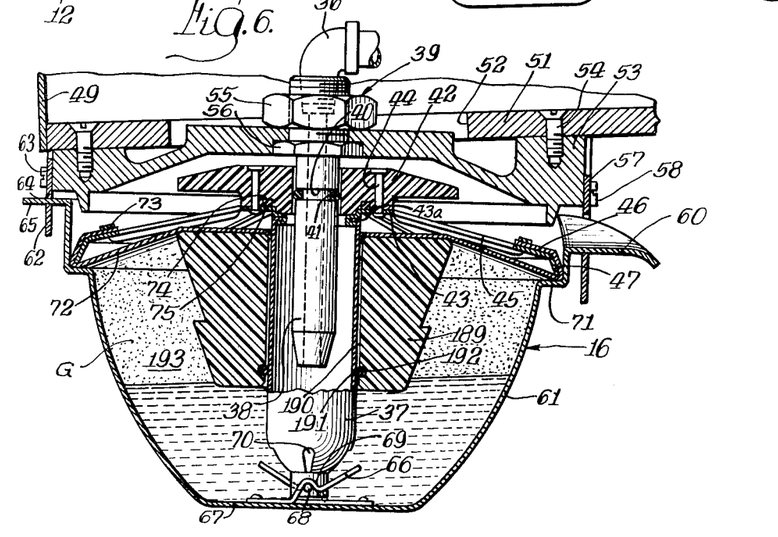
FIG. 6 is a fragmentary enlarged vertical section of the brewing cartridge carried on the control cabinet.

As best seen in FIG. 6, delivery tube 37 is removably mounted on an inlet tube 38 connected to the conduit 36 by a connector 39. The inlet tube 38 is provided with a peripheral groove 40 in which is received an O-ring 41 sealingly engaging a handle 42 secured to an out-turned flange portion 43 at the upper end of the delivery tube 37, as by rivets 44. The flange portion 43, as shown in FIGURE 6, is crimped to the upper end of the tube 37 at 43a. The flange 43 continues outwardly in the form of a plurality of arms 45 to an annular rim 46 having a downturned edge portion 47 defining its outer periphery. As best seen in FIG. 4, the arms 45 radiate outwardly from the handle at approximately 45 degree intervals so as to define a plurality of flow passages 48 therebetween.

The connector 39 is secured to a depending annular flange 49 of the housing 50 of the control 15 by means of an upper plate 51 having an opening 52 therethrough through which the connector 39 and inlet tube 38 extend. A retaining plate 53 is secured to the underside of plate 51 by suitable means such as screws 54. Connector 39 includes an upper nut portion 55 and a lower nut collar portion 56 integral with tube 38 securing the inlet tube 38 to the retaining plate 53. A first mounting bracket 57 is secured to the periphery of the retaining plate 53 as by screws 58 to depend therefrom, as shown in FIG. 3. The bracket includes an elongated horizontally opening slot 59 which slidably receives a spout portion 60 of a hollow bowl portion 61 of the cartridge. A generally similar bracket 62 is secured to a diametric opposite edge portion of the retaining plate 53 as by screws 63 and includes a slot 64 slidably receiving a rearwardly turned flange 65 on the bowl 61 diametrically opposite spout 60. Each of slots 59 and 64 open in a clockwise direction as seen in FIG. 4 so that the bowl 61 may be installed on the brackets 57 and 62 by a movement thereof axially upwardly from below the brackets to a position wherein the spout 60 and flange 65 are aligned with the slots and then by subsequent rotation of the bowl to move the spout into slot 59 and the flange 65 into the slot 64.

The delivery tube 37 is releasably secured to the bowl 61 by means of a pair of upturned fingers 66 secured to the bottom 67 of the bowl as by spot welding, and a transverse pin 68 projecting radially outwardly from a reduced-diameter end portion 69 at the lower end of the delivery tube. As shown in FIG. 6, the delivery tube is provided with a plurality of openings 70 at its lower end immediately adjacent the end portion 69. The bowl 61 is further provided with an annular out-turned flange portion 71. A cloth filter 72 is removably installed in the cartridge to extend under arms 45 outwardly from delivery tube 37 and around the rim portion 46, the distal end of the filter being provided with suitable elastic 73 to retain the distal end portion snugly in embracing relationship with the rim 46. Thus, when the pin 68 is in retained association with the fingers 66, as shown in FIG. 6, the downturned edge 47 presses the filter cloth tightly against the flange 71.

The handle 42 may be provided with an annular groove 74 in which is received an O-ring 75 for sealing the handle to the flange portion 43 at the upper end of the delivery tube. Thus, hot water is delivered from conduit 36 and inlet tube 38 to the exterior of delivery tube 37 from which it passes through openings 70 into the bowl 61. The brew passes upwardly through the brewing ingredients G in the bowl, and thence upwardly through the filter 72 and spaces 45 to flow outwardly from the cartridge through spout 60.

As best seen in FIGS. 2, 3 and 4, the lip 60 of the cartridge is arranged to extend over the spout 76 of the decanter 18. Bracket 17 is provided with a pair of spaced forwardly horizontally extending portions 77 defining a forwardly opening slot 78 adapted to engage the reduced neck portion 79 of the spout whereby the spout may be moved rearwardly into the slot 78 with the spout 76 resting on the upper surface of the bracket portions 77 for facilitated installation of the decanter in the apparatus for receiving the coffee, and for ready movement forwardly therefrom for removal of the decanter as for dispensing of the coffee. As shown, the decanter 18 may be provided with a conventional handle 80 for facilitated manipulation thereof. Cartridge 16 may be provided with a similar handle 81 attached to bowl 61 for facilitated manipulation thereof.

Figure 13:
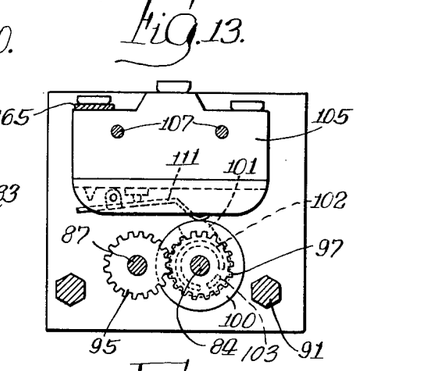
FIG. 13 is an enlarged vertical section taken substantially along the line 13—13 of FIG. 9.

As discussed briefly above, the brewing apparatus 13 is arranged to provide selectively any one of a plurality of desired quantities of beverage. In the illustrated arrangement, the brewing apparatus is arranged to provide selectively any number of cups of coffee from two to twelve cups thereof. In conventional coffee brewers, a wide variation in the flavor and satisfactoriness of the brewed coffee occurs when such a wide range of quantities is selectively provided. The present invention comprehends an improved brewing control which assures a full bodied flavorful brew whether the houswife is making the maximum quantity (herein twelve cups) or any lesser quantity (herein down to two cups). More specifically, it has been found that proper brewing of the coffee requires a substantially similar brew time for substantially all quantities of the coffee to be brewed. This brewing time has been found to be preferably approximately 200 seconds. Further, it has been found that proper brewing of the coffee requires a substantially uniform rate of flow of the hot water through the coffee charge in the cartridge 16. Heretofore, no satisfactory solution to the problem of meeting these requirements has been found. The present invention, however, comprehends an improved arrangement of the brewing apparatus whereby the desirable brewing operations discussed above are provided. More specifically, the invention comprehends the provision of control 15 having means for providing an initial quantity of hot water to the cartridge for wetting the charge in the cartridge bowl 61, and then subsequently delivering a suitable additional quantity of hot water to the cartridge for brewing of the coffee therein and for causing the brewed coffee to pass outwardly over lip 60 into the decanter 18 through spout 76 thereof. The rate of hot water delivery to the cartridge is maintained constant by the flow control device 26, and control 15 includes a timer device 82 which selectively controls the time of delivery of the hot water at the constant rate so that the preselected quantity of coffee is delivered to the decanter 18. More specifically, the timer 82 includes a timer motor 83 driving a shaft 84 having fixed thereon a driver gear 85 which meshes with a driven gear 86 rotatably carried on a control shaft 87 extending forwardly through the front panel 88 of the control housing 89. The motor 83 is carried on a support plate 90 which further carries a pair of forwardly extending posts 91 supporting at their front ends a second support plate 92 for journalling the forward ends of each of the shafts 84 and 87. The shaft 87 is axially movable against the action of a coil spring 93 compressed between the plate 90 and a cam 94 on shaft 87 rearwardly of the gear 86. A second gear 95 is fixed to shaft 87, being spaced forwardly of gear 86 by a tubular spacer 96. Gear 95 meshes with a second gear 97 on shaft 84. Gear 97 is movably retained on the shaft 84 by means of a plurality of leaf springs 98 disposed between the gear 97 and a cam 99 fixed to the shaft 84 forwardly of the gear 97. Gear 97 includes a rearward disc portion 100 which is urged rearwardly to engage a cam 101 fixed on shaft 84. Cam 101 includes a forwardly opening groove 102 which extends less than 360° around the axis of shaft 84 as shown in FIG. 13 and which receives a rearward projection 103 on the disc portion 100 of gear 97. Thus, when the projection 103 is received in the groove 102, the gear 97 is disposed as shown in FIG. 11. However, when the rearward projection 103 is disposed between the opposite ends of the groove 102, the gear 97 is urged thereby forwardly against the action of springs 98 to dispose the disc portion 100 forwardly of the front surface of the cam 101 as shown in FIG. 10.

Figure 10:
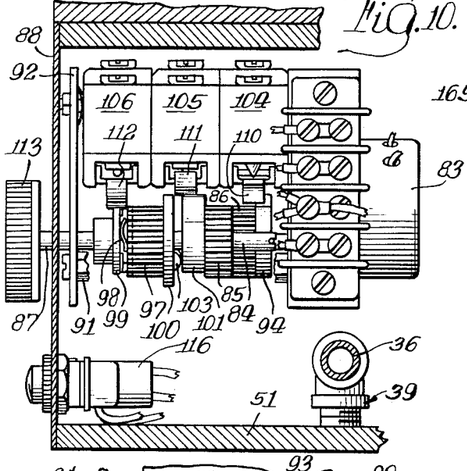
FIG. 10 is a right side elevation thereof.
Figure 11:
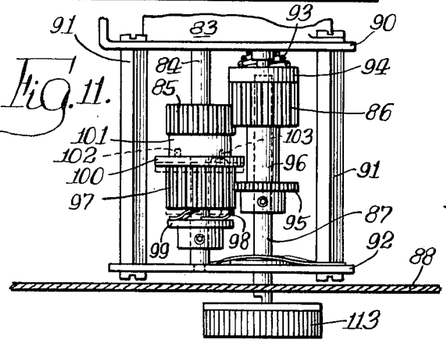
FIG. 11 is a fragmentary bottom view thereof.
Figure 12:
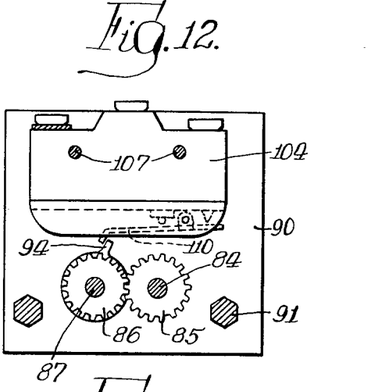
FIG. 12 is an enlarged vertical section taken substantially along the line 12—12 of FIG. 9.
Figure 14:
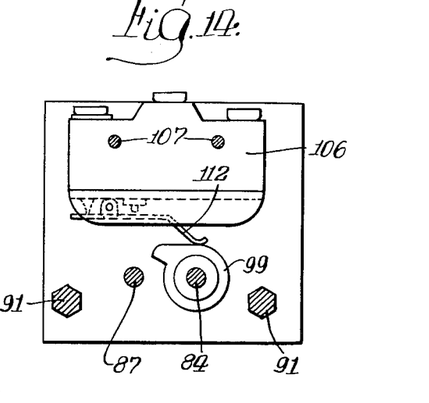
FIG. 14 is an enlarged vertical section taken substantially along the line 14—14 of FIG. 9.

Timer 82 further includes three conventional snap-action switches 104, 105 and 106 retained between brackets 90 and 92 by suitable means such as long bolts 107 and nuts 108 to overlie the cams 94, 101 and 99 and disc 100 as shown in FIG. 10. A conventional terminal block 109 is secured to the bracket 90 to facilitate the making of electrical connections between the respective switches and other elements of the control mechanism. Switch 104 is provided with an actuating finger 110 which is urged by the cam 94 to open the switch 104 as shown in FIG. 12. Switch 105 is provided with an actuating finger 111 which, when engaged either by the disc 100 or the cam 101 as shown in FIG. 13, opens the switch 105. Switch 106 is provided with an actuating finger 112 which, when raised by cam 99, closes the switch 106 as shown in FIG. 14.

Control device 82 further includes a manipulating knob 113 fixedly secured to the forward end of the shaft 87 forwardly of the panel 88 for manually rotating the shaft 87 and for urging the shaft 87 axially rearwardly against the action of spring 93. The knob 113 is provided with an indicator 114 which cooperates with an indicia means 115 on the panel 88 indicating the number of cups to be brewed, herein indicating from two to twelve cups. Further, as shown in FIG. 2, the control 15 is provided with a first signal light 116 for indicating the fact that the temperature of the water in the hot water tank 19 is sufficient for proper brewing of the coffee, and a second signal light 117 for indicating the brewing cycle. A push button actuated switch 118 is installed on the front panel 88 for manual control of the delivery of hot water from the hot water tank through connector 39 when desired.

The electrical power to the brewing apparatus 13 may be provided from a conventional outlet fitting 125 through a connector 126 and cable 127 to a terminal block 128 in the upper portion of the cabinet 14.

The electrical circuitry of the brewing apparatus 13 is shown in FIG. 8. More specifically, leads L1 and L2 of cable 127 are connected to terminals 129 and 130 of terminal block 128 respectively. As shown in FIG. 8, three-way valve 34 comprises a solenoid valve having one terminal 131 of its coil 132 connected to terminal 130 by a conductor 133 and the other terminal 134 of coil 132 connected through a conductor 135 to a terminal 136 of block 128. Terminal 131 of coil 132 is connected through a conductor 137 to terminal 138 of coil 139 of solenoid valve 22 and terminal 138 is connected thorugh a conductor 140 to one terminal 141 of the terminal assembly 30 of heating coil 29. The other terminal 142 of the heating coil is connected through a conductor 143 to one terminal 144 of thermostat 31 and the other terminal 145 of thermostat 31 is connected through a conductor 146 to terminal 129 of block 128. Thermostat 31 includes a switch 147 which closes whenever the temperature of the water in tank 19 drops below a preselected temperature, thereby connecting the heating coil 29 across the leads L1 and L2 for energizing the same. Terminal 144 of thermostat 31 is further connected by a conductor 148 to terminal 149 of block 128 and terminal 150 of solenoid coil 139 is connected by a conductor 151 to terminal 134 of coil 132.

Figure 17:
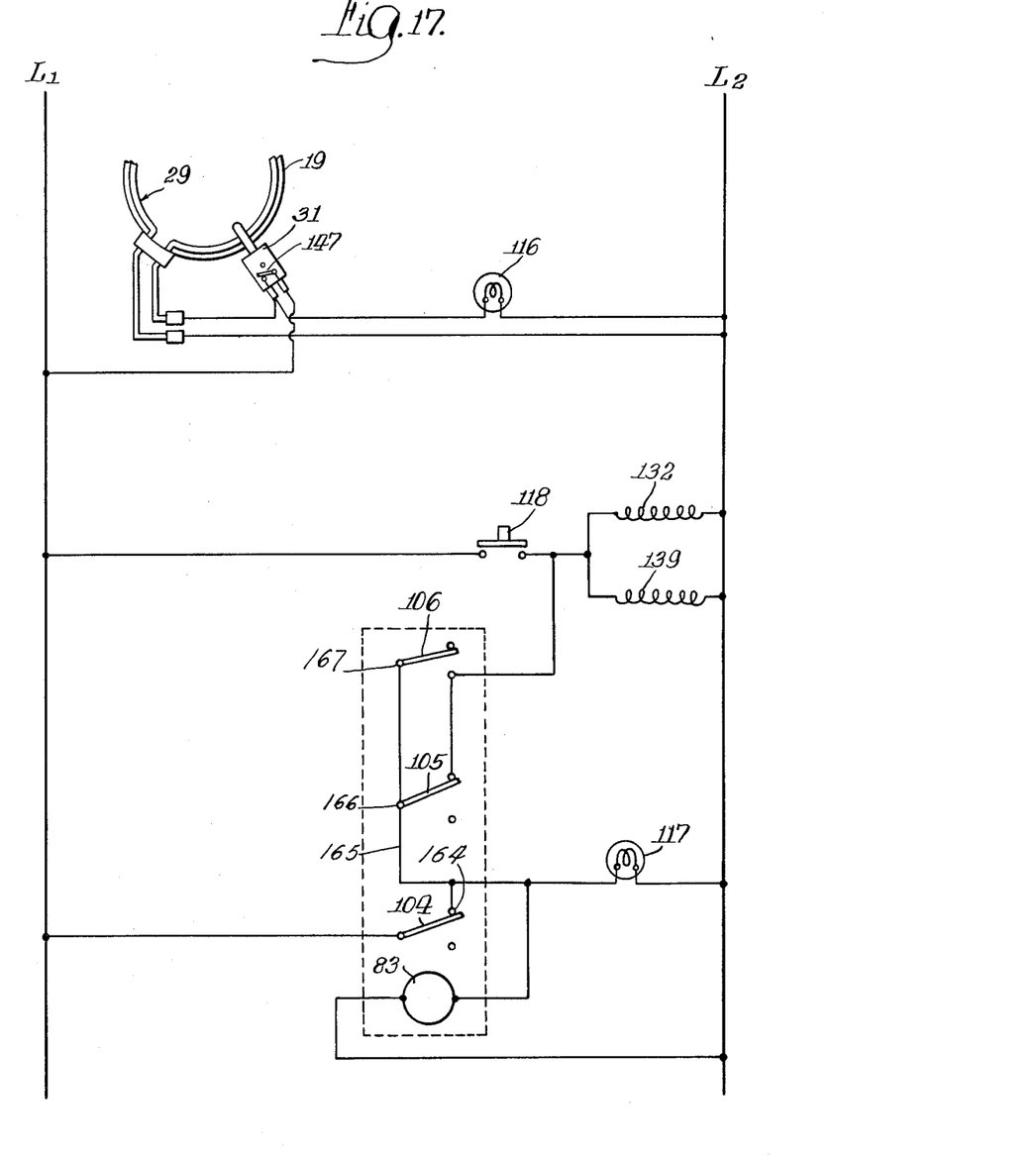
FIG. 17 is a schematic diagram illustrating the control circuitry shown in the wiring diagram of FIG. 8.

The terminal block 109 is provided with terminals 152, 153, 154 and 155 which are connected to terminals 130, 129, 149 and 136 of block 128 respectively by conductors 156, 157, 158 and 159. Terminal 152 is connected by a conductor 160 to one terminal 161 of motor 83 and the other terminal 162 of the motor 83 is connected by a conductor 163 to one normally closed terminal 164 of switch 104. A jumper strap 165 connects terminal 164 to center terminal 166 of switch 105 and center terminal 167 of switch 106 (see FIGS. 8 and 17).

One terminal 168 of indicating lamp 117 is connected to strap 165 by a conductor 169 and the other terminal 170 of indicating lamp 117 is connected to terminal 152 of block 109 by a conductor 171. One terminal 172 of indicating lamp 116 is connected by a conductor 173 to terminal 154 of block 109 and the other terminal 174 of indicating lamp 116 is connected by a conductor 175 to terminal 170 of indicating lamp 117. One terminal 176 of push button switch 118 is connected by a conductor 177 to terminal 153 and the other terminal 178 of push button switch 118 is connected by a conductor 179 to terminal 155. The common, or hinged, terminal 180 of switch 104 is connected by a conductor 181 to terminal 153; the normally closed terminal 182 of switch 105 is connected by a conductor 183 to terminal 155, and the normally open terminal 184 of switch 106 is connected by a conductor 185 to terminal 182 of switch 105.

The operation of brewing apparatus 13 is best seen by firstly considering the operation thereof when the maximum quantity of coffee, herein twelve cups, is to be brewed therein. After placing a suitable quantity of ground coffee in cartridge 16 and installing the cartridge as shown in FIG. 7, the operator turns the control knob 113 to align the indicator 114 with the twelve cup position of the indicia means 115. As the signal light 116 indicates whether or not the temperature of the water in tank 19 is at the preselected temperature providing optimum brewing of coffee, when the signal light 116 is dark, the user momentairly presses in the control knob 113 to initiate the brewing operation. The axial rearward movement of the shaft 87 resulting from the pressing of the control knob 113 causes the cam 94 to move rearwardly of the finger 110 of switch 104, thereby allowing the switch 104 to close and thereby energizing the motor 83 and solenoids 22 and 34. Motor 83 rotates shaft 84 to turn gear 85 which, in turn, drives gear 86 to rotate cam 94 fixed to gear 86. The closing of switch 106 energizes solenoid coil 139, thereby causing hot water to be delivered from the tank 19 to the cartridge 16. Cam 99 is arranged to maintain switch 106 closed for approximately twenty-five seconds, during which time a sufficient quantity of water is delivered to the cartridge to thoroughly wet the grounds and initiate the brewing of the coffee. This quantity of water, however, is not sufficient to overflow the cartridge and cause delivery of coffee to the decanter 18.

Assuming that control knob 113 has been set for twelve cups of coffee, the projection 103 is disaligned with the groove 102 of cam 101 so that when the switch 106 opens, the finger 111 of switch 105 is free of cam 101 and switch 105 is closed, thereby continuing the energization of solenoid coil 139. Switch 105 remains closed for approximately 175 seconds until cam 101 engages the finger 111 and raises it to open the switch 105. During this time, hot water is delivered from tank 19 through the cartridge 16 and over lip 60 into the decanter 18. At the constant rate of delivery of hot water as determined by the control 26, approximately twelve cups of coffee are delivered by this flow of water through the cartridge. When the cam 94 is rotated to the first position of FIGURE 12 it raises the finger 110 to open switch 104 and thereby de-energizes the timer motor 83 and solenoids 22 and 34 to end the brewing cycle. Prior to the opening of switch 104, cam 99 will have rotated sufficiently to reclose switch 106 to re-establish the circuit from L2 to switch 104 so that brewing re-commences immediately upon closing of switch 104 in a subsequent brewing operation.

When the housewife desires to make a smaller quantity of coffee, such as two cups of coffee, she places a suitable quantity of ground coffee in the cartridge and installs the cartridge as shown in FIG. 6; she then turns the knob 113 to align the indicator 114 with the two cup marking of the indicia means 115. This rotates the gear 95 to turn gear 97 sufficiently to position cam 100 rearwardly to underlie finger 111 of switch 105 and thereby prevent closing of the switch 105 until such time as the projection 103 moves out of the groove 102 in cam 101. Thus, the cam 99 firstly functions to cause a twenty-five second delivery of the hot water from tank 19 to initiate the brewing as in the brewing of a twelve cup quantity of coffee. However, the closing of switch 105 to effect the further delivery of water from the tank 19 is delayed until only $2/12$ of the remaining portion of the total 200 second period remains at which time the projection 103 rises out of the groove 102 to urge the disc portion 100 forwardly and at which time the cam 101 is arranged to permit the downward movement of finger 111 to close the switch 105. Switch 105 remains closed thusly for approximately twenty-nine seconds during which time approximately two cups of coffee are delivered from the cartridge into the decanter. At the end of the twenty-nine second period, the cam 101 moves sufficiently to raise the finger 111 and thereby reopen the switch 105 and the disc cam 100 moves rearwardly to underlie finger 111.

Thus, it may be seen that the control 15 is arranged to delay the delivery of the second quantity of hot water from tank 19 in direct proportion to the difference between the cups of coffee desired and the maximum cups of coffee which may be produced by the apparatus. More specifically, the control is arranged to delay the start of the second quantity of hot water to the cartridge in accordance with the formula:

$$\text{Delay time} = \frac{(a-b) \times (c-d)}{c}$$

where:
$a$ = the preselected total brewing time interval, herein 200 seconds
$b$ = the time of delivery of the first quantity of hot water to the cartridge, herein approximately twenty-five seconds
$c$ = the maximum quantity of coffee to be brewed by the apparatus, herein twelve cups
$d$ = the selected quantity of coffee, herein any number of cups from two to twelve By thusly causing a delay in the delivery of the second quantity of hot water from the tank 19 whenever the quantity of coffee to be delivered to decanter 18 is less than the maximum twelve cups, a constant total brewing time is provided notwithstanding the delivery of a wide range of different numbers of cups of coffee to the decanter. Thus, optimum brewing of the coffee is provided at all times. Further, as the delay in the delivery of the second quantity of hot water is not noticeable to the user, as in all cases a delivery of the coffee from the cartridge 16 does not occur until the final delivery of water to the cartridge commences, the brewing operation appears to the user at all times to be a continuous operation.

As shown in FIG. 7, the heated brewing water W enters the cartridge 16 through the openings 70 at the bottom of the delivery tube 37 and causes the coffee grounds G to float upwardly to underlie the filter 72 and form a bed through which the water must pass in the brewing operation. It is desirable that this bed have a substantial thickness, and, thus, where only a small number of cups of coffee are to be brewed, such as six or less, it is desirable to provide some means for maintaining the thickness of the bed of grounds above a preselected minimum thickness to assure proper brewing of the coffee in the cartridge. To this end, a filler plug 189 may be installed on the tube 37, as shown in FIG. 6. As shown, the filler plug may comprise a plastic generally frusto-conical element provided with a central bore 190 having a diameter substantially equal to the outside diameter of tube 37. Further, the filler plug is provided with an annular inwardly opening groove 191 in which is received an O-ring 192 releasably gripping the tube 37 and holding the plug in place thereon as shown in FIG. 6. As shown in FIG. 6, the plug occupies a substantial portion of the free volume of the brewing chamber 193 of cartridge 16 thereby causing the coffee grounds G to have a substantial bed thickness as a result of the substantial decrease in the free horizontal area thereof. Thus, the filler plug serves both to occupy a substantial volume of the chamber 193 thereby causing the amount of water delivered during the twenty-five second initial delivery period to sufficiently fill the chamber to permit the subsequent second delivery of water from the tank 19 to effect the desired delivery of the brew to the decanter, as well as to cause the depth of the bed of coffee grounds to be at least a minimum depth. As the filler plug is retained on the tube 37 primarily by the readily releasable gripping engagement of the O-ring 192 therewith, the filler plug is readily removable for facilitated maintenance.

The preferred construction of the filler plug 189 is one wherein the depth of the coffee grounds is maintained substantially equal to the cross sectional radius of the cartridge 16 and is approximately one-half the width of the body of coffee grounds. Herein the cartridge volume is approximately 30 percent larger than the coffee grounds volume to permit expansion thereof by the initial body of water and to permit facilitated distribution of the water therethrough. The radius of the cartridge in inches is preferably equal to 1.9 times the cube root of the amount of coffee to be brewed (in gallons).

Figure 9:
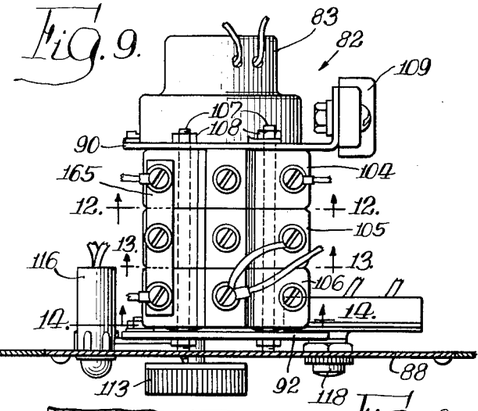
FIG. 9 is an enlarged horizontal section taken substantially along the line 9—9 of FIG. 2 and illustrating the timer control means.
Figure 15:
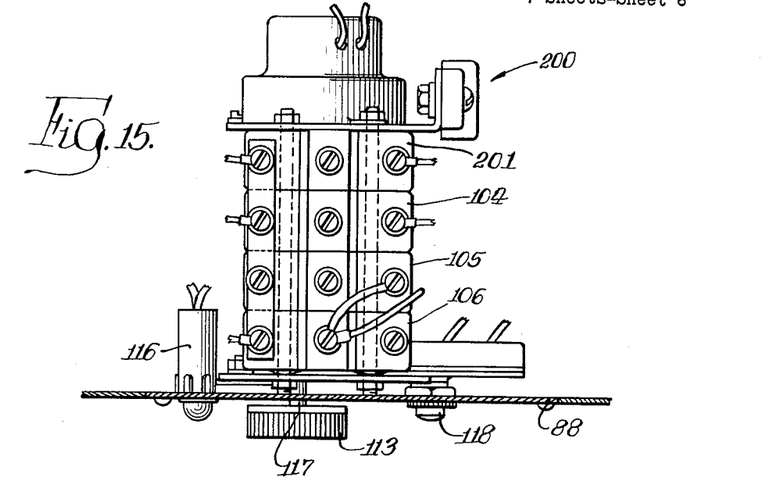
FIG. 15 is a view generally similar to FIG. 9 but illustrating a modified control means.
Figure 16:
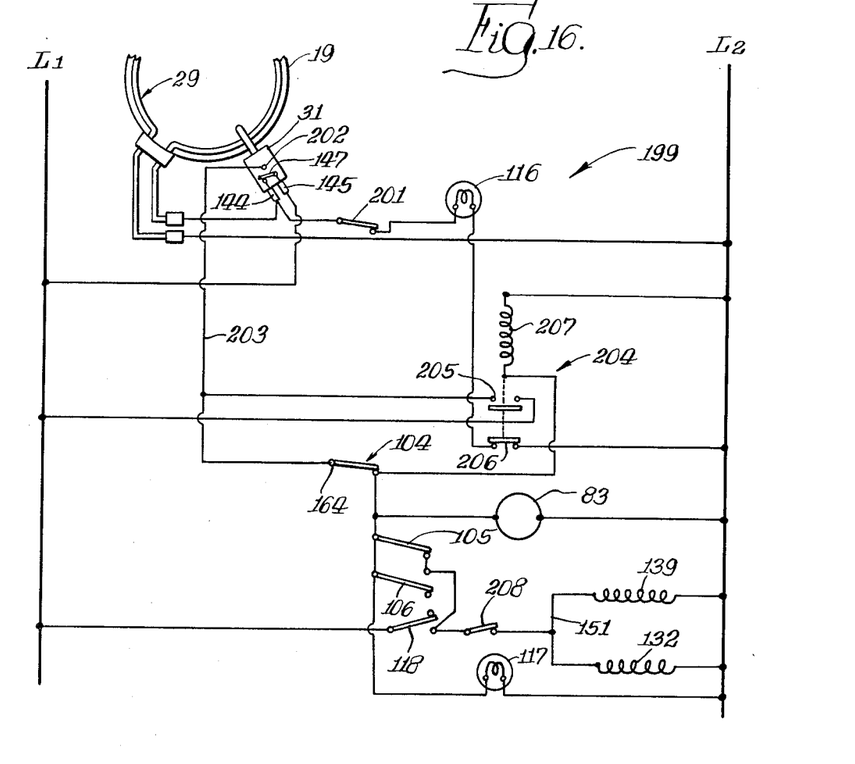
FIG. 16 is a fragmentary schematic diagram illustrating the circuitry including the modified control means.

Referring now to FIGURES 15 and 16, a modified form of control generally designated 199 is shown to comprise a timer 200 generally similar to timer 82, as shown in FIGURE 9, but having an additional switch 201 associated therewith. Switch 201 is identical to switch 104, and is disposed adjacent switch 104 to be operated concurrently therewith, as shown in FIGURE 15.

Referring now to FIGURE 16, the modified control further includes an additional terminal 202 in switch 147 which is connected by a conductor 203 to terminal 164 of normally closed switch 104. A brew relay generally designated 204 is provided having a normally opened switch 205 and a normally closed switch 206 selectively operable by a coil 207. The water heating lamp 116 is connected in series with the normally closed switch 201 from terminal 144 of switch 147 and through normally closed switch 206 of relay 204 to power supply lead $L_2$. The normally opened switch 205 of relay 204 is connected between conductor 203 and power supply lead $L_1$. The relay coil 207 is connected between normally closed switch 104 and power supply lead $L_2$. An emergency off manually operable switch 208 is connected between normally opened switch 118 and conductor 151 electrically connecting coils 132 and 139 of solenoids 34 and 22 respectively. In all other respects, the control 199 is similar to control 15 discussed above.

Thus, the operation of the apparatus utilizing control 199 differs from the operation of the control 15 in the following respects. Until such time as a brew cycle is initiated by the operator depressing the control knob 113, neither light 116 nor 117 is illuminated. When, however, the brewing cycle is initiated by the manipulation of the control knob 113 to simultaneously close switches 104 and 201, one or the other of the lights 116 or 117 will be illuminated. More specifically, if the temperature of the water in tank 19 is the preselected temperature for brewing of the beverage, the switch 147 will be closed with terminal 202, the circuit between terminals 145 and 144 being open. Thus, a circuit is established from lead L1 through switch 147 and conductor 203 to switch 104. As switch 104 is closed, the circuit is continued through relay coil 207 to power supply lead L2, thereby energizing the coil 207 and closing the switch 205. Switch 205 serves as a holding switch in parallel with switch 147 in maintaining coil 207 energized notwithstanding a subsequent movement of switch 147 from terminal 202 as occurs when the temperature of the water in tank 19 drops below the preselected level. Thus, upon initiation of the brewing cycle, "Coffee Brewing" lamp 117 which is in parallel with relay coil 207 is energized and remains energized notwithstanding a subsequent change in the switch arrangement of thermostat control 31 to re-initiate heating of the water in the tank 19.

Alternatively, where the water in tank 19 is below the preselected brewing temperature at the time the user first closes switches 104 and 201, the thermostat switch 147 is closed between terminals 144 and 145, thereby causing an immediate energization of heater 29 in tank 19 and a concurrent illumination of lamp 116 (normally closed relay switch 206 being closed at this time). As the circuits between terminal 145 and terminal 202, and through switch 205 are open at this time, no power is delivered through switch 104, and, thus the brewing cycle is not initiated. However, when the water in tank 19 becomes sufficiently hot, the thermostat 31 is operated to close switch 147 between terminals 145 and 202, and the brewing cycle commences as discussed above. The "Water-Heating" lamp 116 is thusly de-energized by the opening of the circuit between terminals 145 and 144, while the "Coffee Brewing" lamp 117 remains illuminated during the entire actual brewing operation.

Thus, control 199 permits the operator to initiate a brewing cycle by suitable manipulation of knob 113 at any time irrespective of the temperature of the water in the tank 19. When the water in tank 19 is at the preselected brewing temperature, the brewing action commences immediately upon the pressing of control knob 113. In the event, however, that the water in tank 19 is below this temperature at the time of manipulation of knob 113, the brewing action will not commence until the water first reaches the preselected brewing temperature. The signal lights 116 and 117 are dark at all times other than when a brewing operation is initiated. The lights function alternatively to indicate that the brewing is being delayed until the water is brought to proper brewing temperature or that the brewing of the beverage is actually being effected. In all other respects, the embodiment of the invention disclosed in FIGURES 15 and 16 is similar to the herebefore described embodiment.

While we have shown and described certain embodiments of our invention, it is to be understood that they are capable of many modifications. Changes, therefore, in the construction and arrangement may be made without departing from the spirit and scope of the invention as defined in the appended claims.

We claim:
1. Brewing apparatus comprising: means defining a brewing chamber adapted to hold any one of a plurality of different quantities of brewing ingredients corresponding to a plurality of different quantities of brew, said means further defining an open outlet communicating with an upper portion of said chamber for delivering brew from the chamber; means for delivering brewing liquid to the brewing chamber; and control means for controlling the delivering means, said control means including first means for operating said delivering means for a preselected first period of time for causing said delivering means to deliver a first preselected quantity of brewing liquid to the chamber sufficient to initiate brewing of the ingredient, said first preselected quantity being no greater than the capacity of said brewing chamber below said outlet, and second means for operating said delivering means for any one of a plurality of preselected second periods of time for subsequently causing said delivering means to deliver any one of a plurality of different second preselected quantities of brewing liquid to the chamber to continue said brewing, said first and second quantities cumulatively being substantially equal to the capacity of said brewing chamber below said outlet plus a selected one of said different quantities of brew to cause a flow of brew therefrom through said outlet, the total volume of said flow from said chamber being said selected one of said plurality of different quantities of brew, said second means including means for causing said flow to terminate at the end of a preselected time interval subsequent to the initiation of delivery of the first quantity of brewing liquid to the chamber, said preselected time being the same for each total volume of said flow corresponding to each of said different quantities of brew.

2. The brewing apparatus of claim 1 wherein the brew is coffee and said preselected time interval is approximately 200 seconds.

3. Brewing apparatus comprising: means defining a brewing chamber adapted to hold any one of a plurality of different quantities of brewing ingredients corresponding to a plurality of different quantities of brew, said means further defining an open outlet communicating with an upper portion of said chamber for delivering brew from the chamber; means for delivering brewing liquid to the brewing chamber at a preselected uniform rate; and control means for controlling the delivering means including first means for operating said delivering means for a preselected first period of time for causing said delivering means to deliver a first preselected quantity of brewing liquid to the chamber sufficient to initiate brewing of the ingredient, said first preselected quantity being no greater than the capacity of said brewing chamber below said outlet, and second means for operating said delivering means for any one of a plurality of preselected second periods of time for subsequently causing said delivering means to deliver any one of a plurality of different second preselected quantities of brewing liquid to the chamber, said first and second quantities cumulatively being substantially equal to the capacity of said brewing chamber below said outlet plus a selected one of said different quantities of brew to cause a flow of brew therefrom through said outlet for a preselected time interval whereby the total volume of said flow is a preselected one of said plurality of different quantities of brew.

4. The brewing apparatus of claim 3 further including means removably disposed within the brewing chamber for decreasing the free space therein whenever the quantity of brewing ingredient therein is a quantity less than a preselected one of said different quantities, said brewing chamber means including a filter across the top thereof, said ingredient rising to adjacent the filter during flow of the brewing liquid through the chamber to the outlet, said space-decreasing means being arranged to decrease the horizontal cross sectional area of the chamber at the level of the ingredient therein.

5. The brewing apparatus of claim 3 further including means removably disposed within the brewing chamber for decreasing the free space therein whenever the quantity of brewing ingredient therein is a quantity less than a preselected one of said different quantities, said liquid delivering means including a stem extending downwardly into said chamber and said space-decreasing means comprising a filler element removably carried on said stem.

6. In an assembly having an elevated cabinet provided with a bottom and defining an internal space, brewing apparatus comprising: means disposed in said space for providing hot brewing liquid; means defining a brewing chamber; first support means on said cabinet bottom thereof for supporting said chamber means from said cabinet bottom to receive hot brewing liquid from said providing means; means defining a brew holder; and second support means on said cabinet bottom for removably supporting said brew holder from said cabinet bottom laterally adjacent said chamber means to receive brew therefrom.

7. In an assembly having an elevated cabinet provided with a bottom and defining a space, brewing apparatus comprising: means disposed in said space for providing hot brewing liquid; means defining a brewing chamber; first support means on said cabinet bottom for supporting said chamber means from said cabinet bottom to receive hot brewing liquid from said providing means; a decanter having an upwardly widening, flared spout portion; and second support means on said cabinet bottom for removably receiving said spout portion to hang said decanter from said cabinet bottom laterally adjacent said chamber means to receive brew from the chamber means through said spout portion.

8. In an assembly having an elevated cabinet provided with a bottom and defining a space, brewing apparatus comprising: means disposed in said space for providing hot brewing liquid; a control device carried on the cabinet bottom; means defining a brewing chamber; first support means carried by said control device for supporting said chamber means below said control device to receive hot brewing liquid from said providing means; means defining a brew holder; and second support means carried by said control device for removably supporting said brew holder adjacent said chamber means to receive brew therefrom.

9. In an assembly having an elevated cabinet provided with a bottom and defining a space, brewing apparatus comprising: means defining a brewing chamber adapted to hold any one of a plurality of different quantities of brewing ingredients corresponding to a plurality of different quantities of brew, said means further defining an outlet for delivering brew from the container; means disposed in said space for providing brewing liquid to the brewing chamber; first support means at said cabinet bottom for supporting said chamber means below said cabinet to receive hot brewing liquid from said providing means; means defining a brew holder; second support means at said cabinet bottom for removably supporting said brew holder below said cabinet adjacent said chamber means to receive brew therefrom; and control means for controlling the delivering means including first means for causing said delivering means to deliver a first preselected quantity of brewing liquid to the chamber sufficient to initiate brewing of the ingredient, and second means for causing said delivering means to deliver a second preselected quantity of brewing liquid to the chamber to cause a flow of brew therefrom through said outlet, the total volume of said flow being a preselected one of said plurality of different quantities of brew, said second means being arranged to cause said flow to terminate at the end of a preselected time interval measured from the initiation of delivery of the first quantity of brewing liquid to the chamber, said preselected time interval being the same for each total volume of said flow.

10. The brewing apparatus of claim 9 wherein said time interval is approximately 200 seconds.

11. Brewing apparatus comprising: means defining a brewing chamber; means for providing hot water to said chamber including an open-to-atmosphere hot water tank connected to said chamber and having an inlet provided with a valve for controlling flow of water through the hot water tank to the chamber; and means for controlling said valve including a solenoid for operating the valve, a first switch means for energizing the solenoid to open the valve for a first preselected period of time, second switch means for energizing the valve for a second period of time, means selectively operable to adjust the second switch means to cause energization of the solenoid thereby to be for any one of a plurality of preselected time intervals, means for indicating the energization of said control means, means for indicating whether the temperature of the water in said tank is at least a preselected temperature, a timer mechanism for cycling the operation of said switches, and manual control means for effecting operation of the timer mechanism.

12. Brewing apparatus comprising: means defining a brewing chamber; means for providing hot water to said chamber including an open-to-atmosphere hot water tank connected to said chamber and having an inlet provided with a valve for controlling flow of water through the hot water tank to the chamber and an outlet including a first conduit connected to said chamber, a second drain conduit, and a valve means for selectively directing flow of water from said tank to either conduit; and means for controlling said valve including a solenoid for operating the valve, a first switch means for energizing the solenoid to open the valve for a first preselected period of time, second switch means for energizing the valve for a second period of time, means selectively operable to adjust the second switch means to cause the energization of the solenoid thereby to be for any one of a plurality of preselected time intervals, means for indicating the energization of said control means, means for indicating whether the temperature of the water in said tank is at least a preselected temperature, a timer mechanism for cycling the operation of said switches, a second solenoid for controlling said valve means, means for selectively energizing said second solenoid to operate said valve means to direct flow to said first conduit when said valve is open and to said second conduit when said valve is closed, and manual control means for effecting operation on the timer mechanism.

13. Brewing apparatus comprising: means defining a brewing chamber adapted to hold any one of a plurality of different quantities of brewing ingredients corresponding to a plurality of different quantitites of brew, said means further defining an outlet for delivering brew from the container; means for delivering brewing liquid to the brewing chamber; and means removably disposed within the brewing chamber for decreasing the free space therein at least approximately 30% whenever the quantity of brewing ingredient therein is less than a preselected one of said different quantities and effectively maintaining the depth of brewing ingredients in said chamber approximately one-half the width thereof.

14. The brewing apparatus of claim 13 wherein the space decreasing means comprises a frusto-conical downwardly narrowing filler plug disposed axially within the chamber.

15. The brewing apparatus of claim 1 wherein said delivering means is arranged to deliver the brewing liquid at a substantially uniform rate.

16. The brewing apparatus of claim 1 wherein said second means causes the second delivery of brewing liquid to the brewing chamber to start at the time the first delivery thereto stops where the preselected quantity of brew is the maximum of said different quantities.

17. The brewing apparatus of claim 1 wherein said second means causes the second delivery of brewing liquid to the brewing chamber to start after a preselected delay time following the end of the first delivery thereto, said preselected delay time being any one of a plurality of preselected delay times corresponding respectively to the different ones of said quantities of brew other than the maximum quantity.

18. The brewing apparatus of claim 1 wherein said second means causes the second delivery of brewing liquid to the brewing chamber to start after a preselected delay time following the end of the first delivery thereto, said preselected delay time being any one of a plurality of preselected delay times corresponding respectively to the different ones of said quantities of brew other than the maximum quantity, said delay time being determined in accordance with the following formula:

$$\text{Delay time} = \frac{(a-b) \times (c-d)}{c}$$

where:
- $a$ = said preselected time interval
- $b$ = the time of delivery of said first quantity of brewing liquid to the brewing chamber
- $c$ = the maximum one of said different quantities of brew
- $d$ = the selected quantity of brew.

19. The brewing apparatus of claim 3 further including means removably disposed within the brewing chamber for decreasing the free space therein whenever the quantity of brewing ingredient therein is a quantity less than a preselected one of said different quantities.

20. The brewing apparatus of claim 1 wherein said control means includes signal means indicating the heating of the brewing liquid to a preselected brewing temperature.

21. The brewing apparatus of claim 1 wherein said control means includes means precluding initiation of delivery of the brewing liquid only whenever the temperature thereof is below said preselected brewing temperature.

22. The brewing apparatus of claim 1 wherein said control means includes a timer controlling operation of said delivering means and means controlling operation of the timer to initiate operation of said first and second means only whenever said brewing liquid is in a condition unsatisfactory for brewing.

References Cited by the Examiner

UNITED STATES PATENTS

| | | | |
|---|---|---|---|
| 1,572,861 | 2/1926 | Larrey | 99—302 |
| 1,778,792 | 10/1930 | Cameron | 99—284 |
| 2,230,304 | 2/1941 | Locke | 99—282 |
| 2,346,389 | 4/1944 | Peters et al. | 99—285 XR |
| 2,554,367 | 5/1951 | Karlen | 99—303 |
| 2,567,027 | 9/1951 | Peters | 99—303 |
| 2,737,880 | 3/1956 | Johnson | 99—282 X |
| 2,935,012 | 5/1960 | Martin | 99—300 X |
| 2,976,710 | 3/1961 | Sisson | 68—208 X |

CHARLES A. WILLMUTH, *Primary Examiner.*

JOSEPH D. BEIN, ROBERT E. PULFREY, *Examiners.*